US009778441B2

(12) United States Patent
Teraoka

(10) Patent No.: US 9,778,441 B2
(45) Date of Patent: Oct. 3, 2017

(54) CAMERA LENS

(71) Applicant: Hiroyuki Teraoka, Shenzhen (CN)

(72) Inventor: Hiroyuki Teraoka, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 105 days.

(21) Appl. No.: 15/011,592

(22) Filed: Jan. 31, 2016

(65) Prior Publication Data

US 2016/0349485 A1 Dec. 1, 2016

(30) Foreign Application Priority Data

May 28, 2015 (JP) ................................ 2015-108044

(51) Int. Cl.

*G02B 13/00* (2006.01)
*G02B 9/62* (2006.01)
*G02B 13/18* (2006.01)
*G02B 3/04* (2006.01)

(52) U.S. Cl.

CPC ........... *G02B 13/0045* (2013.01); *G02B 9/62* (2013.01); *G02B 3/04* (2013.01); *G02B 13/18* (2013.01)

(58) Field of Classification Search

CPC ...... G02B 9/62; G02B 13/0045; G02B 13/18; G02B 3/04
USPC ........................ 359/713, 682, 752, 756–762; 348/240.99–240.3, 335–369
See application file for complete search history.

(56) References Cited

U.S. PATENT DOCUMENTS 4,364,644 A * 12/1982 Ikemori ................... G02B 9/62 359/713
8,941,926 B2 * 1/2015 Mihara .................. G02B 15/14 359/683
2016/0077332 A1 * 3/2016 Baba ........................ G02B 9/62 359/757

* cited by examiner

*Primary Examiner* — Ricky Mack
*Assistant Examiner* — Kristina Deherrera
(74) *Attorney, Agent, or Firm* — Na Xu; IPro, PLLC

(57) ABSTRACT

A camera lens includes, lined up from the object side to the image side, a first lens with positive refractive power, a second lens with negative refractive power, a third lens with negative refractive power, a fourth lens with positive refractive power, a fifth lens with positive refractive power, and a sixth lens with positive refractive power. The camera lens satisfies specific conditions.

3 Claims, 7 Drawing Sheets

CAMERA LENS

FIELD OF THE INVENTION

The present disclosure is related to a camera lens, and more particularly to a camera lens comprising 6 lenses.

DESCRIPTION OF RELATED ART

In recent years, a variety of cameras equipped with CCD, CMOS or other camera elements are widely popular. Along with the development of miniature and high performance camera elements, the ultrathin and high-luminous flux (Fno) wide-angle camera lenses with excellent optical properties are needed in society.

The technology related to the camera lens composed of six ultra-thin, high-luminous flux f value (Fno) wide angle lenses with excellent optical properties is developed gradually. The camera lens mentioned in the proposal is composed of 6 lenses, lined up from the object side as follows: a first lens with positive refractive power, a second lens with negative refractive power, a third lens with negative refractive power, a fourth lens with positive refractive power, a fifth lens with positive refractive power, a sixth lens with negative refractive power.

The camera lens in embodiments 1 to 3 in the special published bulletin No. 2014-052631 is composed of 6 lenses described above, but the distribution of the refractive power of the second lens and the shape of the third lens are inadequate, therefore TTL/IH≥1.941, and ultrathin degree is not sufficient.

The camera lens disclosed in embodiments 1 to 3 of Japan patent document No. 5651881 is composed of 6 lenses, but, the distribution of the refractive power of the second lens and the third lens, the shape of the second lens are inadequate, therefore TTL/IH≥1.464 and ultrathin degree is not sufficient.

Therefore, it is necessary to provide a new camera lens to overcome the problems mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby is only to explain this disclosure, not intended to limit this disclosure.

Figure 1:
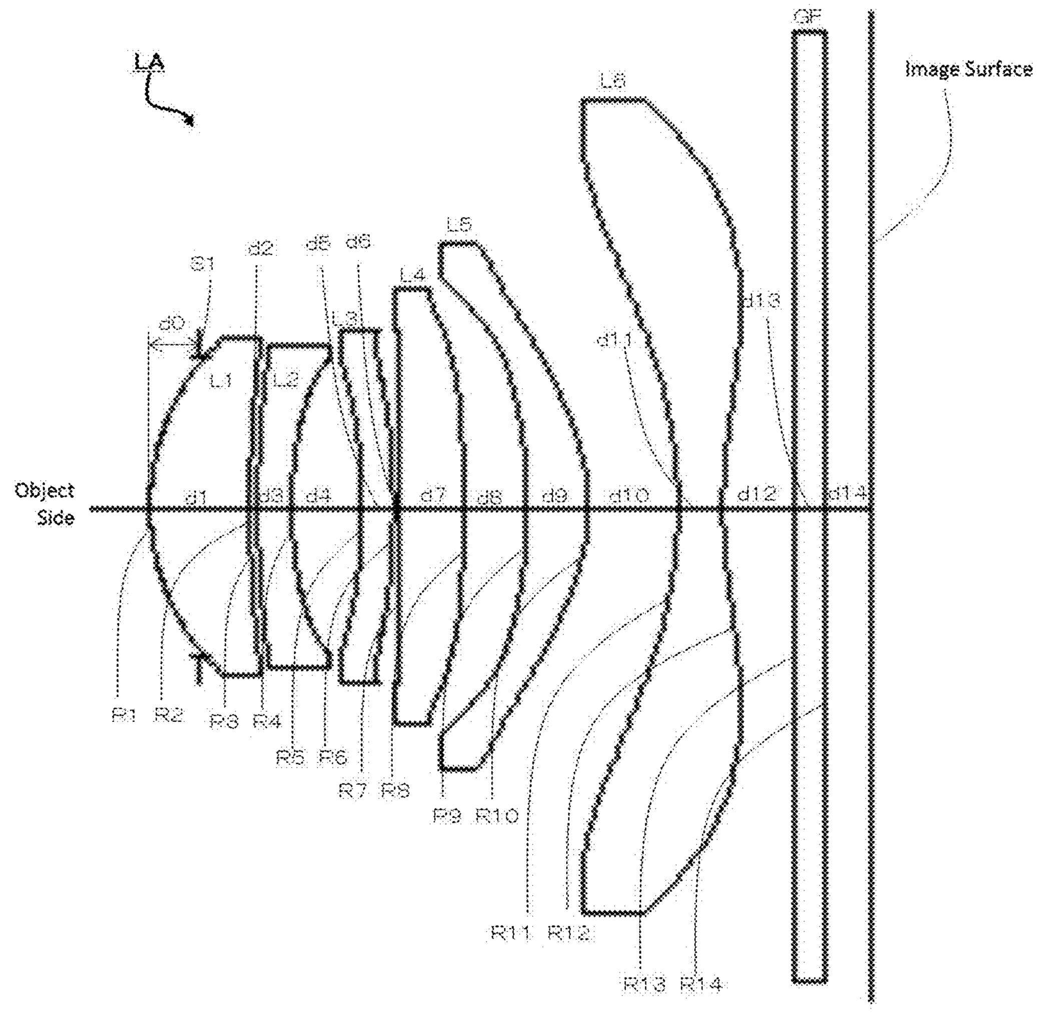
FIG. 1 is the structure diagram of a camera lens LA in the present invention.

The camera lens in one embodiment of the present invention is explained with design drawings. FIG. 1 shows the structural diagram of one embodiment of the camera lens of the present invention. The camera lens LA is composed of 6 lenses which are lined up from the object side to the image side in turn as follows: an open aperture S1, a first lens L1, a second lens L2, a third lens L3, a fourth lens L4, a fifth lens L5 and a sixth lens L6. A glass plate GF is provided between the sixth lens L6 and the imaging plane. The glass plate GF is a cover glass or a light filter with IR cut-off filtration and other functions, or, the glass plate GF is not be provided between the lens L6 and the imaging plane.

The first lens L1 has positive refractive power. The second lens L2 has negative refractive power. The third lens L3 has negative refractive power. The fourth lens L4 has positive refractive power. The fifth lens L5 has positive refractive power. The sixth lens L6 has negative refractive power. In order to correct aberration better, the surface of six lenses is best designed to be non-spherical shape.

The camera lens LA satisfies the following specific conditions (1) to (4).

$$-2.00 \le f2/f \le -1.40 \quad (1)$$

$$-10.00 \le f3/f \le -4.50 \quad (2)$$

$$1.80 \le (R3+R4)/(R3-R4) \le 4.00 \quad (3)$$

$$-15.00 \le (R5+R6)/(R5-R6) \le -4.00 \quad (4)$$

In which:

f: Overall focal distance of the lenses.

f2: The focal distance of the second lens L2.

f3: The focal distance of the third lens L3.

R3: The object side curvature radius of the second lens L2.

R4: The image side curvature radius of the third lens L2.

R5: The image side curvature radius of the third lens L3.

R6: The image side curvature radius of the third lens L3.

The condition expression (1) specifies the negative refractive power of the second lens L2. If the value exceeds the limit of the condition expression (1), along with Fn0≤2.2 ultra-thin and wide-angle development of the lens, it is difficult to correct the axial chromatic aberration.

In addition, the limit of condition expression (1) is better set within the range of the condition expression (1-A) as follows.

$$-1.85 \le f2/f \le -1.48 \quad (1\text{-A})$$

The condition expression (2) specifies the negative refractive power of the third lens L3. If the value exceeds the limit of the condition expression (2), along with Fn0≤2.2 ultra-thin and wide-angle development of the lens, it is difficult to correct magnification chromatic aberration. In addition, the limit of condition expression (2) is better set within the range of the condition expression (2-A) as follows.

$$-7.50 \le f3/f \le -5.00 \quad (2\text{-A})$$

The condition expression (3) specifies the shape of the second lens L2. If the value exceeds the limit of the condition expression (3), along with Fn0≤2.2 ultra-thin and wide-angle development of the lens, it is difficult to correct the axial chromatic aberration.

In addition, the limit of condition expression (3) is better set within the range of the condition expression (3-A) as follows.

$$2.20 \le (R3+R4)/(R3-R4) \le 3.65 \quad (3\text{-A})$$

The condition expression (4) specifies the shape of the third lens L3. If the value exceeds the limit of the condition expression (4), along with Fn0≤2.2 ultra-thin and wide-angle development of the lens, it is difficult to correct magnification chromatic aberration.

In addition, the limit of condition expression (4) is better set within the range of the condition expression (4-A) as follows.

$$-8.00 \le (R5+R6)/(R5-R6) \le -4.50 \quad (4\text{-A})$$

The first lens L1 has positive refractive power and satisfies the following condition expressions (5) and (6).

$$0.72 \le f1/f \le 0.85 \quad (5)$$

$$-1.80 \le (R1+R2)/(R1-R2) \le -0.90 \quad (6)$$

In which f: Overall focal distance of the lenses.

f1: The focal distance of the first lens L1.

R1: The object side curvature radius of the first lens L1.

R2: The image side curvature radius of the first lens L1.

The condition expression (5) specifies the positive refractive power of the first lens L1. When exceeding the lower limit value of the condition expression (5), although in favor of the ultra-thin development of the lens, the first lens L1 has too big positive refractive power and it is difficult to correct the aberration and other issues. On the contrary, when exceeding the upper limit, the first lens has too small positive refractive power, not conducive to the ultrathin development of lens.

The condition expression (6) specifies the shape of the first lens L1.

If exceeding the limit of the condition expression (6), along with Fno≤2.2 ultra-thin and wide-angle development of the lens, it is difficult to correct the spherical aberration and other higher aberration issues.

The fourth lens L4 has positive refractive power and satisfies the following condition expression (5).

$$2.00 \le f4/f \le 10.00 \quad (7)$$

In which:

f: Overall focal distance of the lenses.

f4: The focal distance of the fourth lens L4.

The condition expression (7) specifies the positive refractive power of the fourth lens L4. If the value exceeds the limit of the condition expression (7), it is not conducive to the wide angle and ultra-thin development of the lens.

As six lenses of the camera lens LA have the structure described above and meet all condition expressions, the camera lens with 6 high-luminous flux lenses with excellent optical properties, in TTL (optical length)/IH (image height) 1.45, ultra-thin and wide-angle 2ω≥76°, Fno≤2.2 becomes possible.

The camera lens LA of the present invention is described with the embodiments as follows. The symbols in all embodiments are represented as follows. In addition, the unit of the distance, radius and center thickness is mm.

f: Overall focal distance of the camera lens LA.

f1: The focal distance of the first lens L1.

f2: The focal distance of the second lens L2.

f3: The focal distance of the third lens L3.

f4: The focal distance of the fourth lens L4.

f5: The focal distance of the fifth lens L5.

f6: The focal distance of the sixth lens L6.

Fno: F value.

2ω: Total angle of view

S1: Open aperture.

R: The curvature radius of the optical surface is the center curvature radius of lens.

R1: The object side curvature radius of the first lens L2.

R2: The image side curvature radius of the first lens L2.

R3: The object side curvature radius of the third lens L2.

R4: The image side curvature radius of the second lens L2.

R5: The object side curvature radius of the third lens L3.

R6: The image side curvature radius of the third lens L3.

R7: The object side curvature radius of the fourth lens L4.

R8: The image side curvature radius of the fourth lens L4.

R9: The object side curvature radius of the fifth lens L5.

R10: The curvature radius of the image side of the fifth lens L5.

R11: The object side curvature radius of the sixth lens L6

R12: The image side curvature radius of the sixth lens L6.

R13: The object side curvature radius of the glass plate GF;

R14: The image side curvature radius of the glass plate GF;

d: The center thickness of lenses or the distance between lenses.

d0: The axial distance from the open aperture S1 to the object side of the first lens L1.

d1: The center thickness of the first lens L1.

d2: The axial distance between the image side of the first lens L1 and the object side of the second lens L2.

d3: The center thickness of the second lens L2.

d4: The axial distance between the image side of the second lens L2 and the object side of the third lens L3.

d5: The center thickness of the third lens L3.

d6: The axial distance between the image side of the third lens L3 and the object side of the fourth lens L4.

d7: The center thickness of the fourth lens L4.

d8: The axial distance between the image side of the fourth lens L4 and the object side of the fifth lens L5.

d9: The center thickness of the fifth lens L5.

d10: The axial distance between the image side of the fifth lens and the object side of the sixth lens.

d11: The center thickness of the sixth lens L6.

d12: The axial distance between the image side of sixth lens L6 and the object side of the glass plate GF d13: The center thickness of the glass plate GF.

d14: The axial distance from the image side to the imaging plane of the glass plate GF.

nd: Refractive power of line d.

nd1: Refractive power of line d of the first lens L1 nd2: Refractive power of line d of the second lens L2.

nd3: Refractive power of line d of the third lens L3.

nd4: Refractive power of line d of the fourth lens L4.

nd5: Refractive power of line d of the fifth lens L5.

nd6: The refractive power of line d of the sixth lens L6.

nd7: Refractive power of line d of glass plate GF.

v: Abbe number.

v1: Abbe number of the first lens L1.

v2: Abbe number of the second lens L2.

v3: Abbe number of the third lens L3.

v4: Abbe number of the fourth lens L4.

v5: Abbe number of the fifth lens L5.

v6: Abbe number of the sixth lens L6.

v7: Abbe number of the glass plate GF

TABLE 1

| | R | d | | nd | | vd | |
|---|---|---|---|---|---|---|---|
| S1 | ∞ | d0 = | −0.370 | | | | |
| R1 | 1.76496 | d1 = | 0.728 | nd1 | 1.5831 | v1 | 59.39 |
| R2 | 8.67532 | d2 = | 0.059 | | | | |
| R3 | 8.52752 | d3 = | 0.248 | nd2 | 1.6448 | v2 | 22.44 |
| R4 | 3.28049 | d4 = | 0.512 | | | | |
| R5 | −5.19223 | d5 = | 0.229 | nd3 | 1.6397 | v3 | 23.53 |
| R6 | −6.93210 | d6 = | 0.044 | | | | |
| R7 | 13.25596 | d7 = | 0.465 | nd4 | 1.5441 | v4 | 56.12 |
| R8 | −42.16130 | d8 = | 0.467 | | | | |
| R9 | −4.88948 | d9 = | 0.449 | nd5 | 1.5352 | v5 | 56.12 |
| R10 | −1.56414 | d10 = | 0.659 | | | | |
| R11 | −3.49408 | d11 = | 0.328 | nd6 | 1.5352 | v6 | 56.12 |
| R12 | 2.99351 | d12 = | 0.525 | | | | |
| R13 | ∞ | d13 = | 0.210 | nd7 | 1.5168 | v6 | 64.17 |
| R14 | ∞ | d14 = | 0.352 | | | | |

TABLE 2

| | Cone Constant | Aspherical Coefficient | | | | | | |
|---|---|---|---|---|---|---|---|---|
| | k | A4 | A6 | A8 | A10 | A12 | A14 | A16 |
| R1 | −2.6457E−01 | 7.1806E−03 | 6.3309E−03 | −2.6993E−03 | 1.8000E−03 | −1.8153E−04 | 8.0948E−04 | −4.0201E−04 |
| R2 | 0.0000E+00 | −5.9373E−03 | −2.7016E−03 | 8.0058E−03 | 3.2154E−03 | −2.4778E−03 | −6.6869E−03 | 3.2767E−03 |
| R3 | −5.1420E+00 | −7.6154E−03 | 7.0223E−03 | 6.6977E−03 | 2.8608E−03 | −1.9035E−03 | −6.9415E−03 | 3.1617E−03 |
| R4 | −2.4752E−01 | 1.6986E−02 | 1.0499E−02 | 1.1448E−02 | 3.5142E−03 | 7.6755E−04 | 1.2648E−03 | 2.1145E−03 |
| R5 | 1.4945E+01 | −5.2018E−03 | −2.7645E−02 | 5.3154E−03 | 1.2701E−02 | 4.6451E−03 | −2.0111E−03 | 1.6147E−03 |
| R6 | 2.2863E+01 | −1.3414E−02 | −1.4755E−02 | 6.6927E−03 | 7.2883E−03 | 2.5651E−03 | −9.8356E−05 | −5.8412E−04 |
| R7 | 0.0000E+00 | −5.2967E−02 | 9.0012E−03 | 4.1528E−03 | 6.6717E−04 | −3.4350E−04 | −2.9085E−04 | 4.8092E−05 |
| R8 | 0.0000E+00 | −4.6841E−02 | 3.2202E−04 | 6.1492E−04 | −9.9929E−05 | 5.0849E−05 | 5.9897E−05 | 3.8758E−06 |
| R9 | 5.6021E+00 | −2.0491E−02 | −4.6875E−03 | 1.0712E−03 | −8.0078E−04 | −3.7298E−05 | 4.7146E−05 | 2.3196E−05 |
| R10 | −3.5973E+00 | −2.6378E−02 | 8.2036E−03 | −3.7951E−04 | 4.0294E−05 | −1.2623E−05 | −2.5586E−06 | −2.9441E−07 |
| R11 | 0.0000E+00 | 1.5123E−03 | 1.5066E−03 | 1.3873E−05 | −7.0564E−06 | −1.2349E−07 | 2.2066E−08 | 8.7553E−10 |
| R12 | −2.5742E+01 | −1.8468E−02 | 2.0437E−03 | −2.8494E−04 | 1.2543E−05 | 2.1677E−07 | −5.5634E−09 | 1.2351E−11 |

TTL: Optical length (the axial distance from the object side to the image side of the first lens L1).

LB: The axial distance from the image side to the imaging plane of the sixth lense. (including glass plate GF)

IH: Image height.

$$y=(x^2/R)/[1+\{1-(k+1)(x^2/R^2)\}^{1/2}+A4x^4+A6x^6+A8x^8+A10x^{10}+A12x^{12}+A14x^{14}+A16x^{16} \quad (8)$$

In which, R is the axial curvature radius. k is the cone constant. A4, A6, A8, A10, A12, A14, A16 are aspherical coefficients.

As a matter of convenience, the aspheric surface of all lenses adopts the aspheric surface in condition expression (8). But, not limited to the polynomial forms of the aspheric surface in condition expression (8).

Embodiment 1

Figure 2:
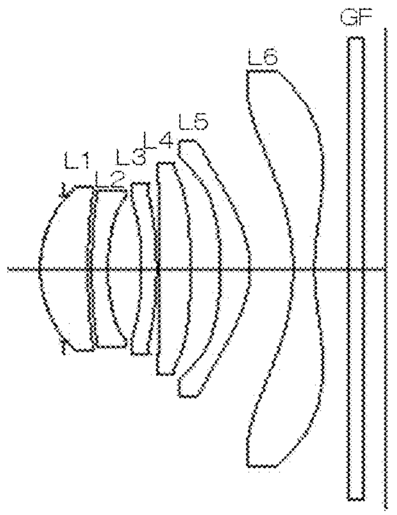
FIG. 2 is the structure diagram of a camera lens LA in the embodiment 1.

FIG. 2 is the structural diagram of the camera lens LA in the embodiment 1. The curvature radius of the object side and image, center thickness and the distance d between the lenses, refractive power nd and Abbe number v of the first lens, second lens and third lens of the camera lens LA in the embodiment 1 are shown in table 1. The cone constant k and aspherical coefficient are shown in table 2.

The values of the embodiments 1-3 and the corresponding values of the parameters specified in the conditions (1)-(7) are listed in table 7.

As shown in table 7, the embodiment 1 satisfies the condition expressions (1) to (7).

Figure 3:
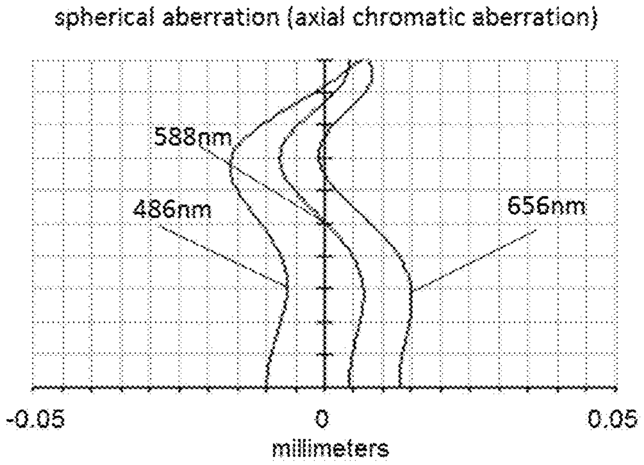
FIG. 3 is the diagram of the spherical aberration (axial chromatic aberration) of camera lens LA of embodiment 1 in the present invention.
Figure 4:
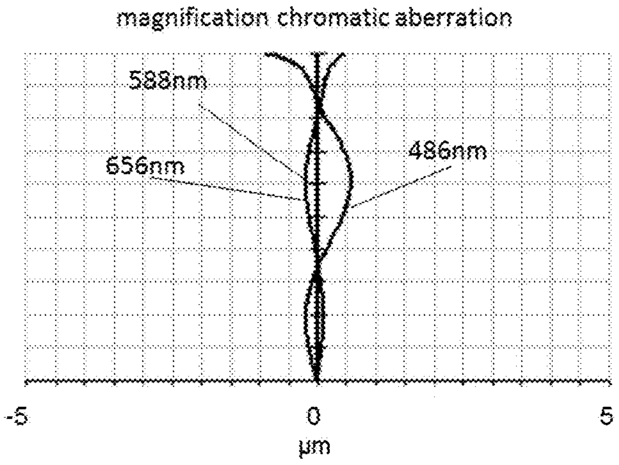
FIG. 4 is the diagram of the magnification chromatic aberration of the camera lens LA in the embodiment 1.
Figure 5:
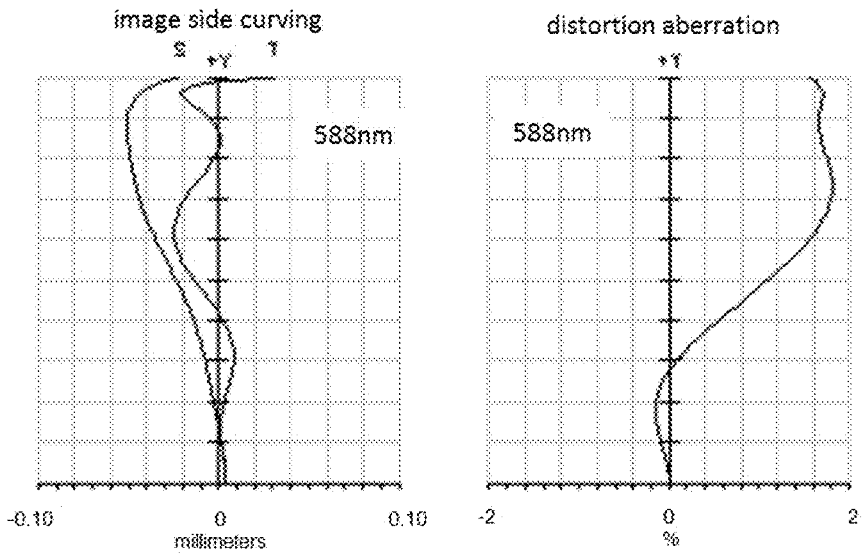
FIG. 5 is the diagram of the image side curving and distortion aberration of the camera lens LA in the embodiment 1.

FIG. 3 is the diagram of the spherical aberration (axial chromatic aberration) of the camera lens LA in the embodiment 1. FIG. 4 is the diagram of the magnification chromatic aberration. FIG. 5 is the diagram of the image side curving and distortion aberration. In addition, the image side curving S in FIG. 5 is the image side curving relative to sagittal plane. T is the image side curving relative to the tangent image side. It is same also in embodiment 2 and 3. In embodiment 1, the camera lens LA with 2ω=78.1°, TTL/IH=1.409, Fno=2.05 ultra-thin, high-luminous flux wide-angle lenses, as shown in FIGS. 3-5, is easy to understand that it has excellent optical properties.

Embodiment 2

Figure 6:
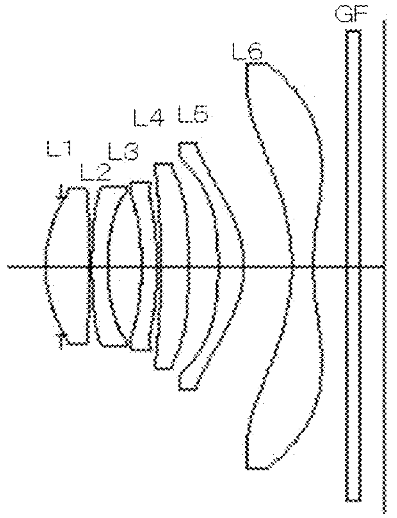
FIG. 6 is the structural diagram of the camera lens LA in the embodiment 2.

FIG. 6 is the structural diagram of the camera lens LA in the embodiment 2. The curvature radius R of the object side and image side of the first lens L1 to the sixth lens L6, center thickness of the lenses and the distance d between the lenses, refractive power nd and Abbe number v of the camera lens LA in the embodiment 2 are shown in table 3. The cone constant k and aspherical coefficient are shown in table 4.

TABLE 3

| | R | d | | nd | | vd | |
|---|---|---|---|---|---|---|---|
| S1 | ∞ | d0 = | −0.250 | | | | |
| R1 | 2.05855 | d1 = | 0.667 | nd1 | 1.5831 | v1 | 59.39 |
| R2 | −162.13476 | d2 = | 0.053 | | | | |
| R3 | 8.31674 | d3 = | 0.246 | nd2 | 1.6448 | v2 | 22.44 |
| R4 | 3.13480 | d4 = | 0.526 | | | | |
| R5 | −5.20424 | d5 = | 0.238 | nd3 | 1.6397 | v3 | 23.53 |
| R6 | −7.00949 | d6 = | 0.048 | | | | |
| R7 | 25.15081 | d7 = | 0.443 | nd4 | 1.5441 | v4 | 56.12 |
| R8 | −31.86314 | d8 = | 0.469 | | | | |
| R9 | −5.10336 | d9 = | 0.400 | nd5 | 1.5352 | v5 | 56.12 |
| R10 | −1.54692 | d10 = | 0.745 | | | | |
| R11 | −3.51704 | d11 = | 0.334 | nd6 | 1.5352 | v6 | 56.12 |
| R12 | 2.99421 | d12 = | 0.525 | | | | |
| R13 | ∞ | d13 = | 0.210 | nd7 | 1.5168 | v6 | 64.17 |
| R14 | ∞ | d14 = | 0.367 | | | | |

Embodiment 3

Figure 10:
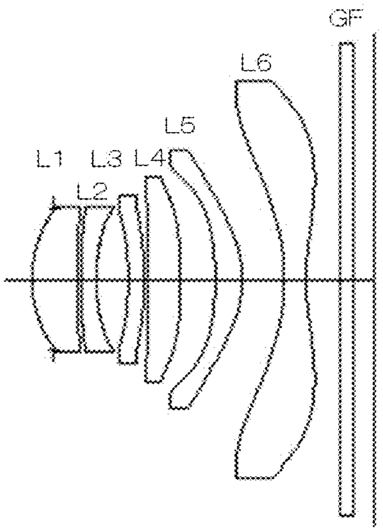
FIG. 10 is the structural diagram of the camera lens LA in the embodiment 3.

FIG. 10 is the structural diagram of the camera lens LA in the embodiment 3. The curvature radius R of the object side and image side of the first lens L1 to the sixth lens L6, center thickness of the lenses and the distance d between the lenses, refractive power nd and Abbe number v of the camera lens LA in the embodiment 3 are shown in table 5. The cone constant k and aspherical coefficient are shown in table 6.

TABLE 5

| | R | d | | nd | | vd | |
|---|---|---|---|---|---|---|---|
| S1 | ∞ | d0 = | −0.340 | | | | |
| R1 | 1.85014 | d1 = | 0.693 | nd1 | 1.5831 | v1 | 59.39 |
| R2 | 12.98282 | d2 = | 0.054 | | | | |
| R3 | 8.21719 | d3 = | 0.240 | nd2 | 1.6448 | v2 | 22.44 |
| R4 | 3.08138 | d4 = | 0.488 | | | | |
| R5 | −5.14525 | d5 = | 0.240 | nd3 | 1.6397 | v3 | 23.53 |
| R6 | −7.31498 | d6 = | 0.048 | | | | |
| R7 | 11.73945 | d7 = | 0.513 | nd4 | 1.5441 | v4 | 56.12 |
| R8 | −11.59443 | d8 = | 0.530 | | | | |
| R9 | −4.60912 | d9 = | 0.417 | nd5 | 1.5352 | v5 | 56.12 |
| R10 | −1.59258 | d10 = | 0.641 | | | | |
| R11 | −3.44315 | d11 = | 0.330 | nd6 | 1.5352 | v6 | 56.12 |
| R12 | 2.90999 | d12 = | 0.525 | | | | |
| R13 | ∞ | d13 = | 0.210 | nd7 | 1.5168 | v6 | 64.17 |
| R14 | ∞ | d14 = | 0.315 | | | | |

TABLE 4

| | Cone Constant | Aspherical Coefficient | | | | | | |
|---|---|---|---|---|---|---|---|---|
| | k | A4 | A6 | A8 | A10 | A12 | A14 | A16 |
| R1 | −3.9914E−01 | 5.1347E−03 | 3.9935E−03 | −4.3998E−03 | 7.0123E−04 | −9.0193E−04 | 3.1784E−04 | −7.5250E−04 |
| R2 | 0.0000E+00 | −3.4547E−03 | −1.5884E−03 | 7.8018E−03 | 2.5746E−03 | −3.1407E−03 | −7.1772E−03 | 2.9993E−03 |
| R3 | 7.2080E+00 | −5.3285E−03 | 9.2349E−03 | 8.4584E−03 | 4.0817E−03 | −1.1852E−03 | −6.5897E−03 | 3.2996E−03 |
| R4 | −1.0918E+00 | 1.3975E−02 | 1.7355E−03 | 5.8184E−03 | 6.3352E−04 | −4.7554E−04 | 8.5234E−04 | 2.0577E−03 |
| R5 | 1.5408E+01 | −6.2889E−03 | −2.7558E−02 | 5.0151E−03 | 1.2420E−02 | 4.4756E−03 | −2.2259E−03 | 1.3892E−03 |
| R6 | 2.0552E+01 | −1.2089E−02 | −1.4051E−02 | 6.9773E−03 | 7.3500E−03 | 2.5705E−03 | −8.6067E−05 | −5.6191E−04 |
| R7 | 0.0000E+00 | −5.3613E−02 | 9.0270E−03 | 4.2467E−03 | 6.8994E−04 | −4.1299E−04 | −3.0380E−04 | 6.8197E−05 |
| R8 | 0.0000E+00 | −4.7013E−02 | 4.6574E−04 | 7.8162E−04 | −1.0260E−05 | 7.6555E−05 | 5.2526E−05 | −9.8378E−06 |
| R9 | 5.6964E+00 | −2.0286E−02 | −4.8657E−03 | 9.9562E−04 | −8.2468E−04 | −4.4750E−05 | 4.4676E−05 | 2.2299E−05 |
| R10 | −3.4719E+00 | −2.6178E−02 | 8.3300E−03 | −3.3935E−04 | 5.1703E−05 | −9.4344E−06 | −1.6710E−06 | −5.0991E−08 |
| R11 | 0.0000E+00 | 1.5489E−03 | 1.5094E−03 | 1.4222E−05 | −7.0229E−06 | −1.1995E−07 | 2.2591E−08 | 9.9851E−10 |
| R12 | −2.2946E+01 | −1.8454E−02 | 2.0477E−03 | −2.8499E−04 | 1.2485E−05 | 2.0698E−07 | −6.8141E−09 | −1.3310E−10 |

As shown in table 7, the embodiment 2 satisfies the condition expressions (1) to (7).

Figure 7:
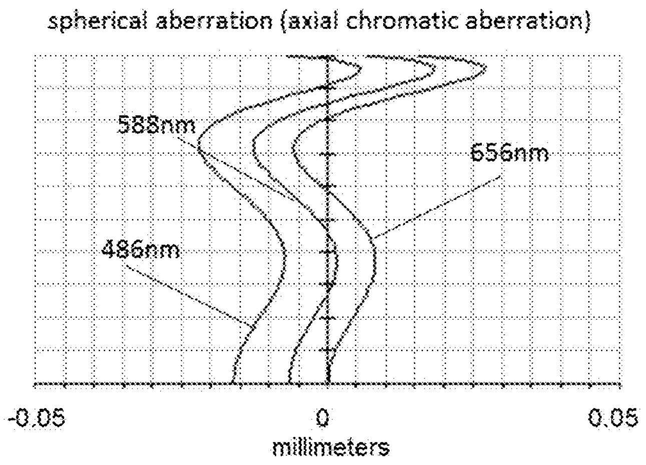
FIG. 7 is the diagram of the spherical aberration (axial chromatic aberration) of camera lens LA of embodiment 2 in the present invention.
Figure 8:
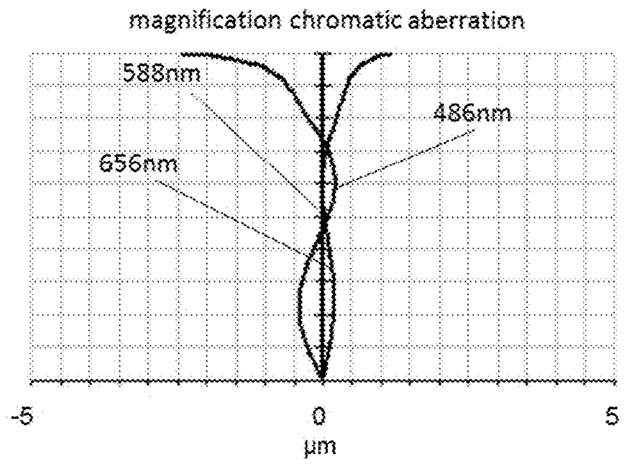
FIG. 8 is the diagram of the magnification chromatic aberration of the camera lens LA in the embodiment 2.
Figure 9:
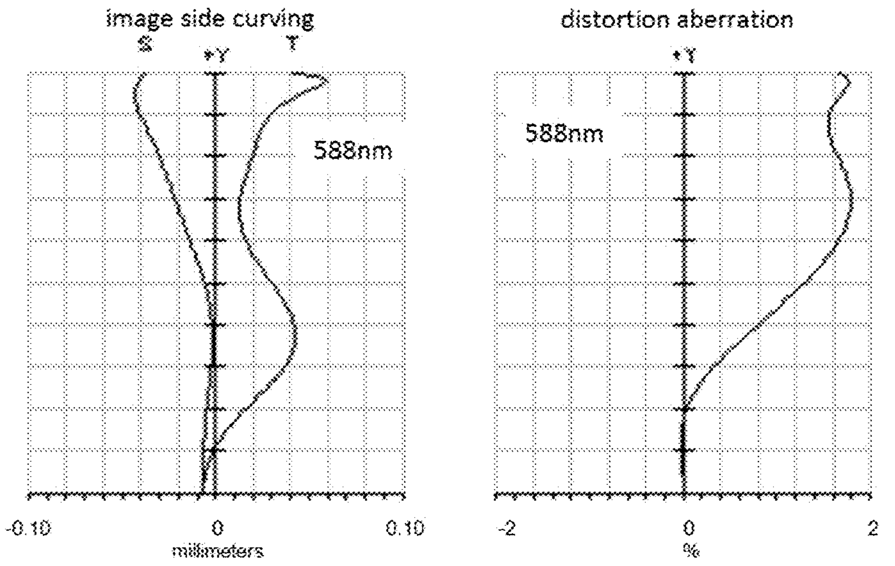
FIG. 9 is the diagram of the image side curving and distortion aberration of the camera lens LA in the embodiment 2.

FIG. 7 is the diagram of the spherical aberration (axial chromatic aberration) of the camera lens LA in the embodiment 2. FIG. 8 is the diagram of the magnification chromatic aberration. FIG. 9 is the diagram of the image side curving and distortion aberration. As shown in FIGS. 7 to 9, for full image angle 2ω=79.2°, TTL/IH=1.408, Fno=2.05 ultra-thin, high-luminous flux wide-angle lenses of the camera lens LA in the embodiment 2 are easy to understand that they have excellent optical properties.

TABLE 6

| | Cone Constant | Aspherical Coefficient | | | | | | |
|---|---|---|---|---|---|---|---|---|
| | k | A4 | A6 | A8 | A10 | A12 | A14 | A16 |
| R1 | −2.7852E−01 | 7.3839E−03 | 5.5077E−03 | −2.8976E−03 | 1.7625E−03 | −2.5232E−04 | 6.6166E−04 | −6.0391E−04 |
| R2 | 0.0000E+00 | −7.7522E−03 | −1.7226E−03 | 8.1227E−03 | 3.0129E−03 | −2.6824E−03 | −6.8245E−03 | 3.2187E−03 |
| R3 | −1.3156E+01 | −9.2638E−03 | 5.3509E−03 | 6.8432E−03 | 3.4362E−03 | −1.4272E−03 | −6.6749E−03 | 3.2726E−03 |
| R4 | −7.0467E−01 | 1.5119E−02 | 9.2835E−03 | 9.2141E−03 | 2.0401E−03 | 6.7868E−05 | 1.0864E−03 | 2.2099E−03 |
| R5 | 1.4708E+01 | −2.9712E−03 | −2.5768E−02 | 5.8409E−03 | 1.2638E−02 | 4.6549E−03 | −1.9855E−03 | 1.4996E−03 |
| R6 | 2.3219E+01 | −1.3800E−02 | −1.5386E−02 | 6.4132E−03 | 7.1404E−03 | 2.4223E−03 | −2.3378E−04 | −6.7842E−04 |
| R7 | 0.0000E+00 | −5.2888E−02 | 9.1069E−03 | 4.0982E−03 | 5.7745E−04 | −4.3429E−04 | −3.0353E−04 | 7.0333E−05 |
| R8 | 0.0000E+00 | −4.4853E−02 | 2.4082E−05 | 4.3692E−04 | −8.9891E−05 | 7.9119E−05 | 7.7391E−05 | 1.2703E−05 |
| R9 | 5.4730E+00 | −2.1679E−02 | −4.7642E−03 | 1.1528E−03 | −7.5970E−04 | −2.7027E−05 | 4.8647E−05 | 2.2901E−05 |
| R10 | −3.7237E+00 | −2.6449E−02 | 8.1111E−03 | −4.1930E−04 | 3.1869E−05 | −1.4001E−05 | −2.7097E−06 | −2.8304E−07 |

TABLE 6-continued

| | Cone Constant | Aspherical Coefficient | | | | | | |
|---|---|---|---|---|---|---|---|---|
| | k | A4 | A6 | A8 | A10 | A12 | A14 | A16 |
| R11 | 0.0000E+00 | 1.4508E−03 | 1.5112E−03 | 1.5098E−05 | −6.9538E−06 | −1.1876E−07 | 2.1807E−08 | 7.9746E−10 |
| R12 | −2.3465E+01 | −1.8288E−02 | 2.0952E−03 | −2.8188E−04 | 1.2541E−05 | 2.0988E−07 | −6.2247E−09 | −1.8842E−11 |

As shown in table 7, the embodiment 3 satisfies the condition expressions (1) to (7).

Figure 11:
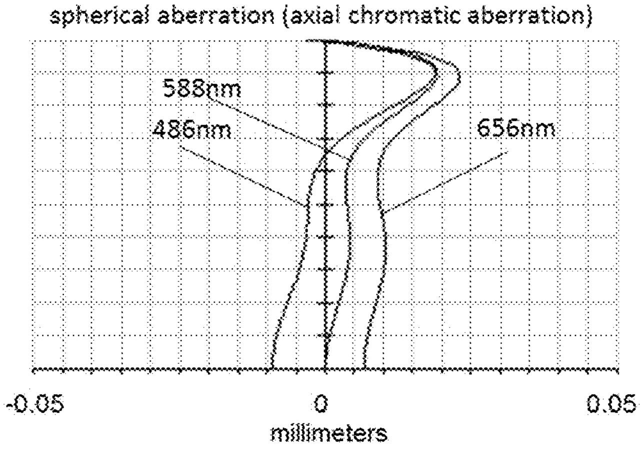
FIG. 11 is the diagram of the spherical aberration (axial chromatic aberration) of camera lens LA of embodiment 3 in the present invention.
Figure 12:
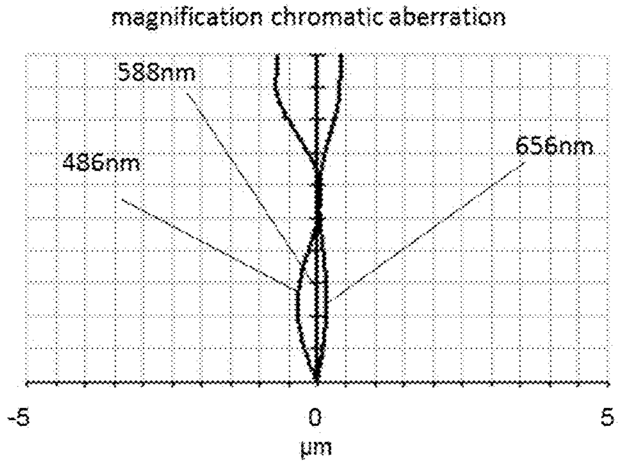
FIG. 12 is the diagram of the magnification chromatic aberration of the camera lens LA in the embodiment 3.
Figure 13:
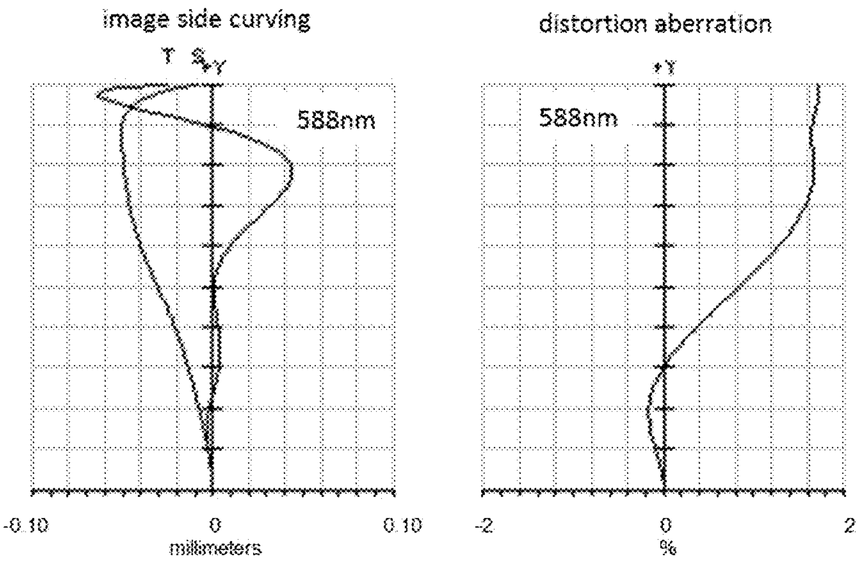
FIG. 13 is the diagram of the image side curving and distortion aberration of camera lens LA of embodiment 3.

FIG. 11 is the diagram of the spherical aberration (axial chromatic aberration) of the camera lens LA in the embodiment 3. FIG. 12 is the diagram of the magnification chromatic aberration. FIG. 13 is the diagram of the image side curving and distortion aberration. In embodiment 3, the camera lens LA with 2ω=79.7°, TTL/IH=1.401, Fno=2.05 ultra-thin, high-luminous flux wide-angle lenses, as shown in FIGS. 11 to 13, is easy to understand that it has excellent optical properties.

The values of the embodiments and the corresponding values of the parameters specified in conditions (1) to (7) are listed in table 7. In addition, the units in table 7 are 2ω(°), f(mm), f1(mm), f2(mm), f3(mm), f4(mm), f5(mm), f6(mm), TTL(mm), LB(mm), IH(mm).

TABLE 7

| | Embodiment 1 | Embodiment 2 | Embodiment 3 | Condition |
|---|---|---|---|---|
| f2/f | −1.85 | −1.79 | −1.77 | (1) |
| f3/f | −7.49 | −7.49 | −6.44 | (2) |
| (R3 + R4)/(R3 − R4) | 2.25 | 2.21 | 2.20 | (3) |
| (R5 + R6)/(R5 − R6) | −6.97 | −6.77 | −5.74 | (4) |
| f1/f | 0.80 | 0.79 | 0.82 | (5) |
| (R1 + R2)/(R1 − R2) | −1.51 | −0.97 | −1.33 | (6) |
| f4/f | 4.08 | 5.83 | 2.46 | (7) |
| Fno | 2.05 | 2.05 | 2.05 | |
| 2ω | 78.1 | 79.2 | 79.7 | |
| TTL/IH | 1.409 | 1.408 | 1.401 | |
| f | 4.554 | 4.445 | 4.401 | |
| f1 | 3.658 | 3.491 | 3.617 | |
| f2 | −8.425 | −7.951 | −7.789 | |
| f3 | −34.088 | −33.300 | −28.338 | |
| f4 | 18.590 | 25.904 | 10.805 | |
| f5 | 4.104 | 3.991 | 4.338 | |
| f6 | −2.690 | −2.969 | −2.894 | |
| TTL | 5.275 | 5.271 | 5.244 | |
| LB | 1.087 | 1.102 | 1.050 | |
| IH | 3.744 | 3.744 | 3.744 | |

DESCRIPTION OF SYMBOLS

LA: Camera lens.
S1: Open aperture.
L1: The first lens.
L2: The second lens.
L3: The third lens.
L4: The fourth lens.
L5: The fifth lens.
L6: The sixth lens.
GF: G glass plate.
R1: The object side curvature radius of the first lens L1.
R2: The image side curvature radius of the first lens L1.
R3: The object side curvature radius of the second lens L2.
R4: The image side curvature radius of the second lens L2.
R5: The object side curvature radius of the third lens L3.
R6: The image side curvature radius of the third lens L3.
R7: The object side curvature radius of the fourth lens L4.
R8: The image side curvature radius of the fourth lens L4.
R9: The object side curvature radius of the fifth lens L5.
R10: The image side curvature radius of the fifth lens L5.
R11: The object side curvature radius of the sixth lens L6.
R12: The image side curvature radius of the sixth lens L6.
R13: The object side curvature radius of the glass plate GF
R14: The curvature radius of the image side of imaging glass plate GF.
d: The center thickness of lenses and the distance between lenses.
d1: The center thickness of the first lens L1.
d2: The distance from the image side of the first lens L1 to the open aperture S1
d3: The axial distance from the open aperture S1 to the object side of second lens L2
d4: The center thickness of the second lens L2
d5: The axial distance between the image side of the second lens L2 and the object side of the third lens L3.
d6: The center thickness of the third lens L3.
d7: The axial distance between the image side of the third lens L3 and the object side of the fourth lens L4.
d8: The center thickness of the fourth lens L4.
d9: The axial distance between the image side of the fourth lens L4 and the object side of the fifth lens L5.
d10: The center thickness of the fifth lens L5.
d11: The axial distance between the image side of fifths lens L5 and the object side of sixth lens L6.
d12: The center thickness of the sixth lens L6.
d13: The axial distance between the image side of sixth lens L6 and the object side of the glass plate GF.
d14: The center thickness of the glass plate GF.
d15: The axial distance from the image side to the imaging plane of the glass plate GF.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera lens comprising, lined up from the object side to the image side, a first lens with positive refractive power, a second lens with negative refractive power, a third lens with negative refractive power, a fourth lens with positive refractive power, a fifth lens with positive refractive power, and a sixth lens with positive refractive power, wherein the camera lens satisfies the following conditions (1)-(4):

$$-2.00 f2/f -1.40 \quad (1)$$

$$-10.00 < f3/f -4.50 \quad (2)$$

$$1.80<(R3+R4)/(R3-R4)<4.00 \quad (3)$$

$$-15.00<(R5+R6)/(R5-R6)<-4.00 \quad (4)$$

In which:

f: Overall focal distance of the lenses f2: The focal distance of the second lens L2 f3: The focal distance of the third lens L3

R3: The curvature radius of the object side of the second lens L2

R4: The image side curvature radius of the second lens L2

R5: The image side curvature radius of the third lens L3

R6: The image side curvature radius of the third lens L3.

2. The camera lens according to claim 1 further satisfying the following conditions (5)-(6):

$$0.72<f1/f<0.85 \quad (5)$$

$$-1.80<(R1+R2)/(R1-R2)<-0.90 \quad (6)$$

In which:

f: Overall focal distance of the lenses f1: The focal distance of the first lens L1

R1: The object side curvature radius of the first lens L1

R2: The image side curvature radius of the first lens L1.

3. The camera lens according to claim 1 further satisfying the following condition (7):

$$2.00\leq f4/f\leq 10.00 \quad (7)$$

In which:

f: Overall focal distance of the lenses f4: The focal distance of the fourth lens L4.

* * * * *